Figure 1:
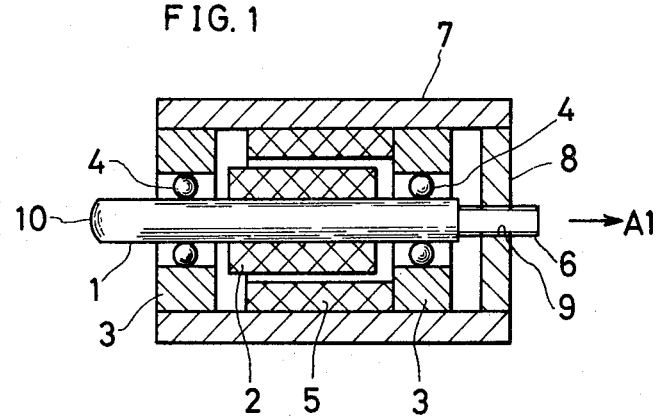

United States Patent [19]

Imahashi

[11] 4,347,452
[45] Aug. 31, 1982

[54] MICRO-DISPLACEMENT DEVICE

[75] Inventor: Issei Imahashi, Yamanashi, Japan

[73] Assignee: Telmec Co., Ltd., Japan

[21] Appl. No.: 187,170

[22] Filed: Sep. 15, 1980

[30] Foreign Application Priority Data

Mar. 5, 1980 [JP] Japan .................................. 55-27614

[51] Int. Cl.³ .............................................. H02K 7/12
[52] U.S. Cl. .................................. 310/76; 310/49 R; 310/80; 74/441
[58] Field of Search ............... 74/409, 441; 310/49 R, 310/80, 83, 76, 78

[56] References Cited

U.S. PATENT DOCUMENTS 2,627,040  1/1953  Hansen .............................. 310/49 R
3,278,474  10/1966  Roller et al. .......................... 310/76
4,249,426  2/1981  Erikson et al. ......................... 74/441

OTHER PUBLICATIONS

Gutmann, F. T., "18 Ways to Control Backlash", Product Engineering, Oct. 26, 59, pp. 71-75.

Primary Examiner—J. D. Miller
Assistant Examiner—D. L. Rebsch
Attorney, Agent, or Firm—Price, Heneveld, Huizenga & Cooper

[57] ABSTRACT

A stator and a rotor of a step motor are disposed in an axially staggered relationship with each other so that the rotary shaft of the rotor can be freely displaced in the axial direction with respect to the stator. Around the outer periphery of the rotary shaft are formed screw threads so as to be threadedly engaged with a nut provided on a casing in which the stator of the step motor is fixedly mounted. Thereby the rotational displacement of the rotor can be converted into an axial displacement thereof, and thus a minute amount of desired controlled displacement can be realized with the influence of a backlash between the screw threads on the rotary shaft and the nut eliminated by an electromagnetic characteristic of the step motor.

2 Claims, 2 Drawing Figures

MICRO-DISPLACEMENT DEVICE

The present invention relates to a micro-displacement device that is available in production facilities of the semiconductor industry or the like.

Generally, in the semiconductor industry or the like, such type of devices can achieve a quite minute amount of displacement such as, for example, a displacement of 1 micron or less of a body or a part of an apparatus, and it was difficult to construct such devices by making use of the conventional mechanical structures. This is because in the case of constructing the device by employing transmission mechanisms such as gears or the like, even if manipulation is made so as to achieve a minute amount of displacement, the displacement of the driving means is hardly transmitted to a driven member in a correct quantity due to the influence of backlash of the gears.

Moreover, in the case of making a body or a part of an apparatus displace by a minute amount as described above, heretofore driving means making use of an electromagnetic force or a voice-coil type actuator has been used, but these driving means used in the prior art were not free from the disadvantages that the mechanisms was large in size, the handling of the driving means was troublesome and the driving means was expensive.

It is therefore one object of the present invention to provide a micro-displacement device which is more compact and is more easy in handling than the prior art device.

Another object of the present invention is to provide a micro-displacement device which is simpler in structure and can be manufactured at a lower cost than the prior art device.

Still another object of the present invention is to provide a micro-displacement device which has a self-holding capability for the position after displacement.

In order to achieve the aforementioned object, according to one feature of the present invention, there is provided a micro-displacement device, in which a stator and a rotor of a step motor are disposed in an axially staggered relationship with each other, the rotary shaft of the rotor is supported so as to be freely displaced in the rotational and axial directions, screw threads are formed of the rotary shaft, and said screw threads are theadedly engaged with a threaded hole of a nut provided in said step motor.

Figure 2:
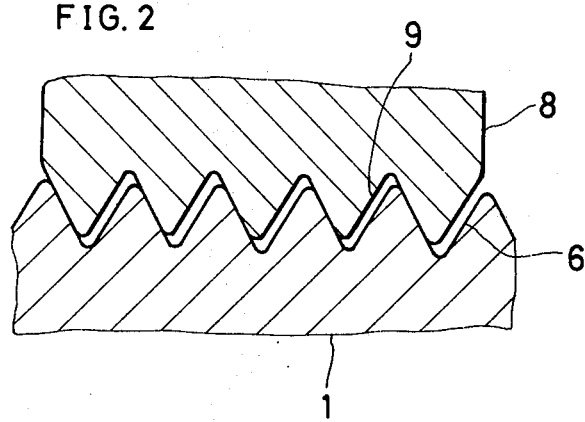

The above-mentioned and other features and objects of the present invention will become more apparent by reference to the following description of its preferred embodiment taken in conjunction with the accompanying drawings, wherein:

FIG. 1 is a schematic longitudinal cross-section view showing an outline of a micro-displacement device according to one preferred embodiment of the present invention, and FIG. 2 is a partial longitudinal cross-section view showing the state of threaded engagement between screw threads on a rotary shaft and a nut in the same device, in which a backlash is depicted in an exaggerated magnitude.

Referring now to FIGS. 1 and 2, reference numeral 1 designates a rotary shaft fixedly secured to a rotor 2 of a step motor along its center axis, and the rotary shaft 1 is supported by ball bearings 3,3 so as to be freely displaceable in the rotational and axial directions. Reference numeral 4 designates balls in the ball bearing 3. Reference numeral 5 designates a stator which forms a step motor jointly with the rotor 2. With regard to the step motor, various types of step motors are known at present, and in most of the known step motors a rotor is rotated by a predetermined angle by causing an electric current through a number of coils around a stator in a regular sequence. In other words, the rotational position of the rotor can be controlled by electric means.

Around the aforementioned rotary shaft 1 are formed screw threads 6, and these screw threads are threadedly engaged with a nut 8 provided on a casing 7. Numeral 9 designates a threaded hole of the nut 8. Accordingly, when the above-described rotary shaft 1 rotates by one revolution, the rotary shaft 1 is displaced in the axial direction owing to the threaded engagement. The amount of the axial displacement is one pitch of the screw threads 6 per one revolution. Since both the bearings 3,3 and the stator 5 are fixedly secured to the casing 7, if the rotational angle of the rotor 2 is controlled by an electric rotational driving device (not shown), then the axial position of the rotor 2 is also controlled. In FIG. 1, if any provision is made such that a desired stage (not shown) may be pushed by one end 10 of the rotary shaft 1, then a minute amount of displacement of the stage can be realized in a controlled manner.

As to the control capability for a rotational angle of the heretofore known step motors, at present it is easily achieved to divide one revolution into 400 discrete rotational displacement, and if a vernier driving system is employed, then it is possible to divide one revolution even into 1000 or 2000 discrete rotational displacements. Accordingly, if the pitch of the screw threads 6 is selected to be 0.2 millimeters and one discrete rotational displacement of the rotor is chosen to be one-thousandth of one revolution, then it is possible to control the axial displacement of the rotor in the step of 0.25 microns.

Here it is to be noted that in the micro-displacement device according to the present invention, the influence of backlash between the nut 8 and the screws threads 6 on the rotary shaft 1 can be always eliminated. As shown in FIG. 1, the stator 5 and the rotor 2 are preliminarily disposed in an axially staggered relationship to each other. Accordingly, the centers of the magnetic fields generated by the stator 5 and the rotor 2, respectively, are located as deviated in the axial direction. When a current is passed through the coils (not shown) wound around the stator 5, besides the force of controlling the angular position of the rotor 2, an axial force as represented by arrow A1 acts upon the rotor 2 due to the deviation of the respective centers of the magnetic fields. In other words, the axial force is exerted upn the rotor 2 in the direction for eliminating the deviation between the centers of the magnetic fields. Moreover, generally in a step motor, in view of its nature a current is always flowing through any one of a plurality of coils wound around the stator regardless of whether the motor is rotating or stationary, and hence, the above-described axial force in the direction shown by arrow A1 is always exerted upon the rotary shaft 1 of the micro-displacement device having the above-described construction. Consequently, even if any backlash between screw threads should exist in the above-described threaded engagement portion, the rotary shaft 1 is always urged against the nut 8 in the direction shown by arrow A1, so that the screw threads 6 on the rotary shaft 1 are always urged against the threads of the threaded hole 9 of the nut 8 in the rightward direction as shown in FIG. 2. Accordingly, the influence of the backlash between the screw threads is always naturally eliminated in the micro-displacement device according to the present invention. Under such a condition, if the rotary shaft 1 is rotated by the step motor by a given rotational angle, the rotary shaft 1 can be displaced in the axial direction by the corresponding distance with the influence of the backlash eliminated as a natural result of the novel construction of the device.

As described above, with the micro-displacement device according to the present invention it is possible to realize a very small amount of displacement while eliminating the influence of the backlash which is present in the transmission means.

Still further, since a step motor generally has a position holding capability with respect to the angular position of the rotor, the micro-displacement device according to the present invention naturally has a position holding capability with respect to the axial position of the rotary shaft 1 which is threadedly engaged with the nut 8 in the above-described backlashless manner.

What is claimed is:

1. A backlash free micro-displacement device comprising a rotary shaft fixedly secured along a center axis of a rotor of a step motor and having screw threads formed around its outer periphery, bearings fixedly secured to a casing for supporting said rotary shaft so as to be rotationally and axially displaceable, a stator of the step motor provided on said casing for rotationally driving said rotor, and a nut provided on said casing and threadedly engaging the screw threads around said rotary shaft said rotor in all axial positions of said shaft being axially offset in the same direction with respect to said stator with the respective magnetic fields of said rotor and stator overlapping and the centers of their magnetic fields being staggered and urging said shaft in the same axial direction at all times.

2. A backlash free micro-displacement device including a stationary housing having a pair of ends; a stator fixed to said housing; a shaft mounted in and extending through said housing and rotationally supported in said ends, said housing at one end being externally threaded, one end of the shaft being threaded and threadedly engaging said one end of said housing; a rotor mounted on said shaft concentrically of said stator with a portion of said rotor being axially offset in the same direction from said stator in all axial positions of said shaft with the resulting offset in the centers of the rotor and stator magnetic fields maintaining a constant mono-directional axially acting force on said shaft for maintaining the same faces of said threads of the shaft and housing end engaged irrespective of the axial position of said shaft and both when the shaft is rotating and stationary.

* * * * *

UNITED STATES PATENT AND TRADEMARK OFFICE
CERTIFICATE OF CORRECTION

PATENT NO. : 4,347,452
DATED : August 31, 1982
INVENTOR(S) : Issei Imahashi

It is certified that error appears in the above—identified patent and that said Letters Patent is hereby corrected as shown below:

Column 1, line 25:

"mechanisms" should be --mechanism--

Column 2, line 5:

"causing" should be --passing--

Column 2, line 29:

"displacement" should be --displacements--

Column 2, line 40:

"screws" should be --screw--

Signed and Sealed this

Eleventh Day of January 1983

[SEAL]

Attest:

GERALD J MOSSINGHOFF

Attesting Officer

Commissioner of Patents and Trademarks